United States Patent [19]
Finch et al.

[11] 3,966,288
[45] June 29, 1976

[54] METHOD FOR MAKING HIGH INTENSITY DISCHARGE ARC TUBE

[75] Inventors: William A. Finch, Marblehead; Frederick A. Loughridge, Ipswich; Rudolf Marcucci, Beverly, all of Mass.

[73] Assignee: GTE Sylvania Incorporated, Danvers, Mass.

[22] Filed: Dec. 12, 1974

[21] Appl. No.: 532,078

Related U.S. Application Data

[62] Division of Ser. No. 390,538, Aug. 22, 1973, Pat. No. 3,905,795.

[52] U.S. Cl. .................................................. 316/19
[51] Int. Cl.² ........................................ H01J 9/18
[58] Field of Search .................. 316/17, 18, 19, 20; 65/109, 110, 276, 279, 292; 313/220

[56] References Cited
UNITED STATES PATENTS

| | | | |
|---|---|---|---|
| 3,309,188 | 3/1967 | Porter et al. | 65/109 |
| 3,685,880 | 8/1972 | Sobieski | 316/19 |
| 3,858,078 | 12/1974 | Koury | 313/220 |
| 3,870,919 | 3/1975 | Hellman et al. | 313/220 |

Primary Examiner—Roy Lake
Assistant Examiner—James W. Davie
Attorney, Agent, or Firm—James Theodosopoulos

[57] ABSTRACT

A quartz tube is held in a lathe and rotated while heat is applied to an intermediate portion thereof. When the quartz is heated to plasticity, rotation is stopped and a mold is rapidly closed around the softened quartz. The quartz is shaped in the mold by the rapid application of gas pressure in the tube.

1 Claim, 2 Drawing Figures

METHOD FOR MAKING HIGH INTENSITY DISCHARGE ARC TUBE

This is a division, of application Ser. No. 390,538, filed Aug. 22, 1973, now U.S. Pat. No. 3,905,795.

BACKGROUND OF THE INVENTION

1. Field Of The Invention

This invention relates to arc tubes for high intensity discharge (HID) lamps and especially to apparatus and method of making such arc tubes.

2. Description Of The Prior Art

The arc tubes of high intensity discharge lamps have generally consisted of cylindrical uniform diameter tubes of vitreous quartz or other high temperature glass. Such tubes were prepared by merely cutting long lengths of extruded tubing to the desired length. Electrodes were then sealed in the ends of the arc tube and the arc tube was then exhausted and filled through an exhaust tube attached thereto, which was then tipped off to complete fabrication of the arc tube.

SUMMARY OF THE INVENTION

This invention concerns the manufacture of an arc tube which does not consist of a cylindrical uniform diameter tube as in the prior art. Such an arc tube may have an arch shape, as disclosed in copending application Ser. No. 377,442, filed July 9, 1973, entitled "Metal Halide Discharge Lamp Having An Arched Arc Tube", now U.S. Pat. No. 3,858,078, or an expanded section, as disclosed in copending application Ser. No. 380,737, filed July 19, 1973, entitled "Metal Halide Discharge Lamp Having Expanded Section Arc Tube", now U.S. Pat. No. 3,896,326 the disclosures of which are incorporated herein by reference.

In the manufacture of an arc tube in accordance with this invention, a straight length of cylindrical quartz tubing is rotatably held, such as in the chucks of a lathe. One end of the tubing is closed and the other end is connected to a supply of pressurized gas. While the tubing is rotated, an intermediate portion thereof is heated by a high temperature flame using, for example, a ribbon burner. When the plastic or working temperature of the quartz is attained, about 1800° to 1900°C, the rotation is stopped, the burner is moved out of the way and two mold halves are rapidly closed around the heated quartz. As soon as the mold is closed, gas pressure is introduced into the tubing to blow the heated quartz into the shape of the mold. Because the working temperature of the quartz is so high, it is necessary that the shaping of the tubing be extremely rapid, say, less than about one second after the flame is removed, lest the heated quartz cool below its working temperature. After the shaped tubing is removed from the mold, the excess tubing length is severed and the arc tube is ready for completion.

DESCRIPTION OF THE PREFERRED EMBODIMENT

Figure 1:
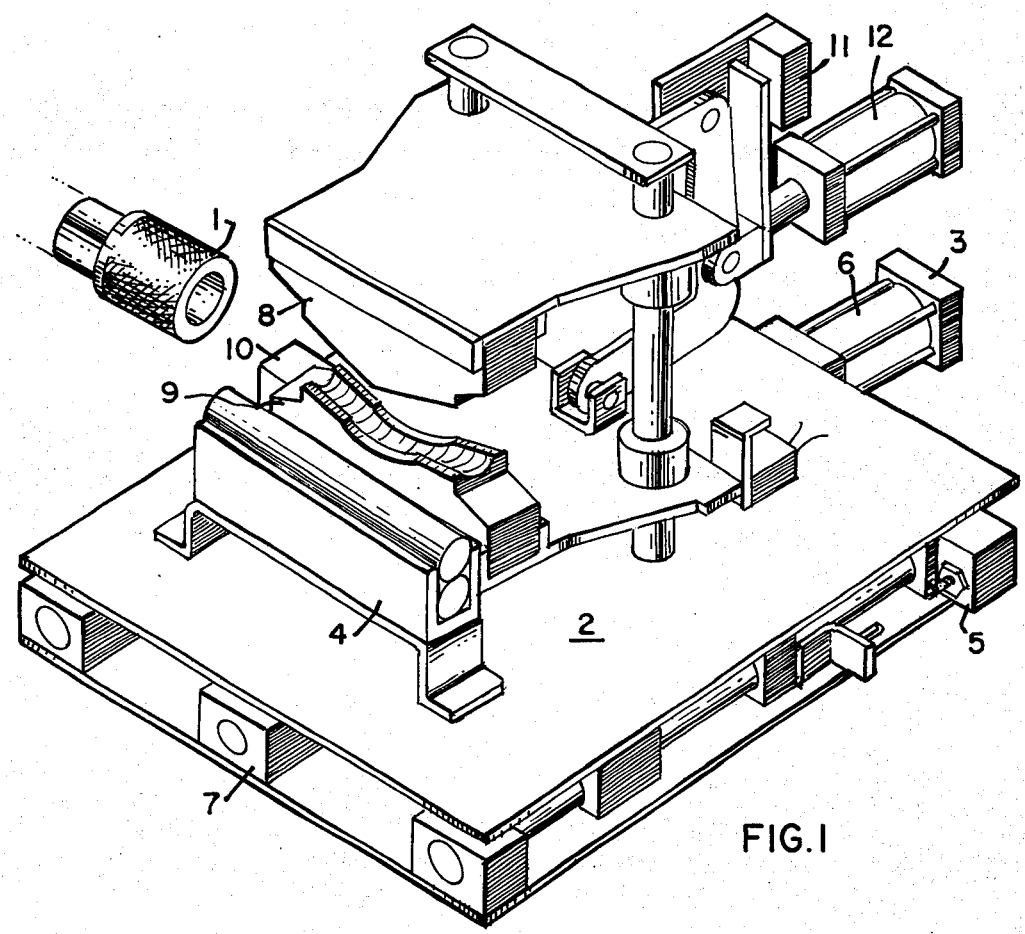
FIG. 1 in the drawing is a perspective view of apparatus for the manufacture of HID arc tubes in accordance with this invention.
Figure 2:
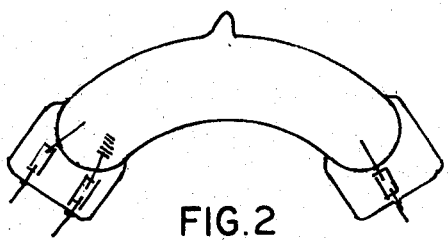
FIG. 2 shows a completed arch shaped arc tube.

The ends of a length of quartz tubing, longer than the finished arc tube and having a thicker wall than that of the finished arc tube, are supported in two collet type chucks 1 (only one is shown in the drawing). One end of the tubing is closed, such as by a stopper or by use of a blind hole type of collet, and the other end is attached, through the chuck, to a supply of pressurized gas (not shown). In one example, the tubing was 9 inches long by 12 mm diameter.

Upon actuation of a sequence starter button, the chucks start rotating and slide 2 is moved backward against a stop 3 to bring ribbon burner 4 into position proximate the quartz tubing, burner 4 being supported on slide 2. At the same time a microswitch 5 is energized by slide 2, which ignites burner 4 by means of a solenoid. Heat is applied to the rotating quartz tubing until it is heated to plasticity, that is, its working temperature, about 1800°–1900°C. When the temperature is reached, slide 2 is energized and moved forward by air cylinder 6 against stop 7, which moves burner 4 out of the way. At the same time, top and bottom molds 8 and 9, which are supported on slide 2, are moved into position above and below the heated quartz tubing, burner 4 is turned off and the chucks stop rotating. The movement of slide 2 also energizes microswitches 10 and 11. Microswitch 10 activates air cylinder 12 which closes molds 8 and 9 onto the heated quartz tubing. Microswitch 11 energizes a solenoid (not shown) which open a valve and admits pressurized gas into one end of the quartz tubing. In one example, the gas was nitrogen at a pressure of 12 psi. The pressurized gas blows the softened quartz into the shape of molds 8 and 9. The whole sequence, from burner removal to shaping of the tubing, takes less than about 1 second.

After cooling and removal from the mold, an intermediate portion of the tubing has been molded into the desired arc tube shape, while tubing portions at each end thereof are in a form suitable for the subsequent sealing of electrodes into the arc tube. The end portions of the tubing, which include the portions held in the chucks, are severed prior to embedment of the electrodes in the arc tube. In the specific example mentioned above, the molded arc tube was about 2 inches long and had an arch shape, with an outside diameter of 16 mm. The seal portions at each end thereof had a length of about 1 inch and a diameter of about 13 mm. The end portions of the tubing, about 2½ inches each, were severed. The arc tube was completed by attaching an exhaust tube thereto, sealing electrodes in press seals at the ends of the arc tube, exhausting and filling the arc tube with, for example, an inert starting gas, mercury and metal halide through the exhaust tube and then tipping off the exhaust tube.

In order to improve the material efficiency, that is, to reduce the amount of quartz that is discarded at the ends of each arc tube after molding, it may be desirable to start with an original length of quartz tubing that is sufficiently long so that a plurality of arc tubes may be formed from it. The arc tubes may then be individually shaped by a single mold pair, or may be shaped at one time by a number of molds in alignment with each other. In this case only the portions of the tubing held in the chucks need be discarded after molding.

We claim:

1. The method of making an arc tube for a high intensity discharge lamp comprising the steps of: rotating a length of vitreous quartz tubing; heating by means of a movable heater an intermediate portion of said length to the softening point; rapidly moving the heater away from the tubing and moving a closable two piece mold proximate the softened portion of the tubing; closing the mold around said softened portion and admitting pressurized gas into the softened portion to blow the tubing into the shape of the mold which is arch shaped; severing the unnecessary length of tubing; sealing electrodes in the ends of the molded portion of the tubing; and exhausting and filling to form a completed arch shaped arc tube.

* * * * *